United States Patent [19]

Howlette

[11] Patent Number: 4,959,861
[45] Date of Patent: Sep. 25, 1990

[54] SECURITY SYSTEM FOR COMPUTER SOFTWARE

[76] Inventor: Edward L. Howlette, 1814 Metzerott Rd., Apt. 13, Adelphi, Md. 20783

[21] Appl. No.: 218,385

[22] Filed: Jul. 13, 1988

[51] Int. Cl.$^5$ .............................................. H04L 9/32
[52] U.S. Cl. ........................................ 380/4; 380/25; 380/50; 340/825.31; 340/825.34; 235/380; 235/382
[58] Field of Search ...................... 380/3–5, 380/23–25, 52, 49, 50; 364/200, 900, 246.6–246.9, 969, 969.1–969.4, 971.1; 340/825.31, 825.34; 235/380, 382

[56] References Cited

U.S. PATENT DOCUMENTS

| | | | |
|---|---|---|---|
| 3,245,045 | 4/1966 | Randlev | 364/200 |
| 4,433,207 | 2/1984 | Best | 380/4 |
| 4,454,594 | 6/1984 | Heffron et al. | 364/900 |
| 4,458,315 | 7/1984 | Uchenick | 364/200 |
| 4,462,076 | 7/1984 | Smith, III | 364/200 |
| 4,471,163 | 9/1984 | Donald et al. | 380/4 |
| 4,558,176 | 12/1985 | Arnold et al. | 380/4 |
| 4,562,306 | 12/1985 | Chou et al. | 380/4 |
| 4,593,353 | 6/1986 | Pickholtz | 364/200 |
| 4,599,489 | 7/1986 | Cargile | 380/4 |
| 4,609,777 | 9/1986 | Cargile | 380/4 |
| 4,634,807 | 1/1987 | Chorley et al. | 380/4 |
| 4,644,493 | 2/1987 | Chandra et al. | 364/900 |
| 4,652,990 | 3/1987 | Pailen et al. | 364/200 |
| 4,670,857 | 6/1987 | Rackman | 380/4 |
| 4,683,553 | 7/1987 | Mollier | 380/4 |
| 4,688,169 | 8/1987 | Joshi | 364/200 |
| 4,757,534 | 7/1988 | Matyas et al. | 380/25 |
| 4,791,565 | 12/1988 | Dunham et al. | 364/200 |
| 4,799,258 | 1/1989 | Davies | 380/23 X |

FOREIGN PATENT DOCUMENTS 0138219  4/1985  European Pat. Off. ................ 380/4

Primary Examiner—Stephen C. Buczinski
Assistant Examiner—Bernarr Earl Gregory
Attorney, Agent, or Firm—Reed Smith Shaw & McClay

[57] ABSTRACT

The disclosure relates to a security system for computer software. A plug-in circuit accompanies each legitimately purchased softward package. The software includes a communication system to decode signals generated by the plug-in circuit. Where the appropriate signal is sensed the program is executed. If the proper code is not sensed the program shuts down.

13 Claims, 5 Drawing Sheets

FIG. 3.

READY

```
10 REM
20 REM
30 REM        THE KEY NUMERIC PULSE COMBINATION DECODER
40 REM        THIS ALLOWS YOU TO HAVE A KEY WHICH ALLOWS
50 REM     THE USER TO ENTER A COMBINATION LIKE A MASTER LOCK
60 REM               TO GAIN ACCESS TO A PROGRAM.
70 REM
80 REM
90:
100:
110 TST=0
120 IFJOY (2)=0THEN120
130 IFJOY (2)=128THENBEGIN: TST=TST+2: GOTO140: BEND
140 PRINTJOY (2)  IF JOY (2)=128THEN140
150 PRINTJOY (2)  IF JOY (2)=0THEN150
160 IF JOY (2)=3THENBEGIN: TST=TST+3: IF TST=5THEN200: BEND
170 TST=11
180 IF TST>5THEN: PRINT"- - ♢ ♡ ! ! ! !":
190 GOTO130
200 PRINT ", I  0 ⌐_ '♡ . . ."
```

READY.

READY.

READY.

FIG. 4.

READY.

```
10 REM
20 REM
30 REM            THIS IS THE FIRST LEVEL OF SECURITY.
40 REM        HERE THE COMPUTER TELLS YOU TO INSERT THE
50 REM        KEY IF IT IS NOT ALREADY DONE, ONCE INSERTED
60 REM                IT WILL PROCEED TO LEVEL 2.
70 REM
80 REM
90::
100 IF JOY (2)=132 THENLOAD (PROGRAM NAME), 9
110 PRINT "♡QQQQQQQQQQ                    R﹀/♡⁻⌐ ⌐Ⱶ⌐_♧∨'⌐"
120 GOTO 100
```

READY.

READY.

FIG. 5.

READY.

```
10 REM
20 REM
30 REM
40 REM
50 REM
60 REM
70 REM
80 REM
90 REM
100 REM
110 REM
120 REM
```
THIS IS SECURITY LEVEL 2. HERE IF THE KEY IS STILL
PRESENT IN THE PORT SPECIFIED ALL VARIABLES AND ARRAYS
WILL BE INITIALIZED THEN PROGRAM IS LOADED.
IF AN ATTEMPT TO CIRCUMVENT THIS STEP IS MADE THEY
WILL NOT EXECUTE PROPERLY DUE TO A LACK OF VARIABLES

THIS CAN ALTERNATIVELY BE CODED TO ERASE THE DISK IF
THE PROPER KEY IS NOT INSERTED, OR IT IS ABSENT

```
130 TRAP 130
140 BEND
150 PRINT "♡"
160 PRINT "♡QQQQQQQQ"
170 IF JOY(2)<>0 THEN 200
180 BEND
190 GOTO160
200 IF JOY(2)=132THENBEGIN:
210 PRINT "♡QQQQQQQQ"
220 IF JOY(2)<>132THEN 250
230 BEND
240 GOTO200
250 LOAD PROGRAM COMMAND
```
READY.

READY.

FIG. 6.

READY.

```
10 REM
20 REM
30 REM
40 REM
50 REM
60 REM
70 REM
```
THIS CODE READS THE USER PORT FOR THE
PRESENCE OF A KEY AND WILL ERASE A DISK
OR EXECUTE A PROGRAM ACCORDINGLY.

```
80 POKE56579,15
90 Q=PEEK(56577)
100 IF Q=128 THEN 120: ELSE 140
110 GOTO90
120 LOAD PROGRAM ROUTINE
130 REM ::::::::::::::::::::::::::::
140 ERASE DISK ROUTINE
```

SECURITY SYSTEM FOR COMPUTER SOFTWARE

BACKGROUND AND DISCUSSION OF INVENTION

The invention involves a method and apparatus for providing security for computer software. There have been a number of systems adopted for securing software including codes within the program itself, as well as interaction with certain external elements used through various ports for inputting certain information in the computer.

For the software sold in large quantities and in disk form, it is relatively easy for the purchasers of the software to make unlimited copies and distribute them as they desire. As a result of this copying, substantial revenues have been lost because of the availability of the software and the difficulty of prohibiting copying beyond that necessary for each individual user. Approaches in attempting to prevent this type of copying are security systems integrated with the software, certain licensing techniques, which allegedly prohibit the user from making copies other than back-up or archival copies for their own personal use, and interactive systems with certain external attachments.

Particularly for software where the security system resides solely in the program, it has become relatively easy to break the code used in protecting a particular software scheme. In fact, there have been marketed other programs solely for the purposes of breaking these codes. They enable buyers to duplicate protective software and avoid any internal security measures. Once the code is voided or broken, the user can then recopy the program and distribute it through computer networks to literally thousands of other unauthorized users.

There have been a number of approaches in attempting to overcome this problem. An example of these is demonstrated in U.S. Pat. No. 4,446,519, issued to Thomas, on May 1, 1984, entitled Method And Apparatus For Providing Security For Computer Software (hereinafter the Thomas patent). This patent relates to an electronic security device which utilizes a plug-in circuit board element, along with each legitimately purchased software package. The software packages are programmed to establish a communication such that when a disk or tape is loaded into the working memory of the computer, the program sequence is commenced. The software generates coded interrogation signals which are transmitted to the electronic security device. The device includes logic circuit for evaluation of interrogation signals generated by software. If the security device is the correct one, the device will recognize the interrogation signals and transmit the proper coded response signals to the working memory of the computer. Only if the software in the working memory receives the proper response signals from the ESD, the software will then generate command signals to the computer which cause execution of the program. If the response signals are not received by the working memory containing the software program, the command signals are not generated and the program cannot be executed by the computer.

In another embodiment discussed in the Thomas patent, it is stated that a failure to receive proper response signals from ESD can even require the program in the working memory to be erased or scrambled in a fashion that does not even permit the program pirate to determine the nature of the incorrect response signal.

The problem with this approach is that it still enables copiers and pirates to break the code, because the code is ultimately dependent on the software. For example, if a system simply fails to execute the program, the system can be reprogrammed to generate enough interrogation signals until the proper code is ultimately reached. Once reached, the ESD will then emit the correct signal to complete execution of the program. Even in a situation where the proper response signal is not received by the working memory and the program can be scrambled, the computer program can be rebooted and various codes imparted to the security device until the proper code is ultimately generated in which, in case the correct signal will ultimately be transmitted for completion of execution of the program. Thus the systems discussed by Thomas are deficient, because of the prospect of breaking the code.

The invention described herein, overcomes the problems in devising security codes for software. The invention involves the use of a key which is loaded into a port of the computer. The key generates a binary, or other types of coded signals. The computer program includes an evaluation sequence such that the program will be executed only upon receipt of a predetermined coded signal. The key is not software dependent on receiving any signal from the computer, but generates its own signal which is preselected at the time the software and the key are sold. If the correct signal is not received by the program, it simply shuts down. There is no programming device which can devise various sequences for breaking the code and enabling the program to be executed. Rather, the only way the code can be broken is by arriving at a key which will work properly with the disk or tape which operates as a result of the coded signal transmitted by the key. With this system, it is literally impossible for the code to be broken and is immune to other code breaking programs.

The above has been a brief discussion of the problems of the prior art and the advantages of the invention. Other advantages will be perceived by those skilled in the art in the detailed description of the preferred embodiment which follows.

BRIEF DESCRIPTION OF THE DRAWINGS

FIG. 3 is a code listing for the decoder combination which permits access to the program.

FIG. 4 is a code listing advising user to insert key if not already done.

FIG. 5 is a code listing for executing program if proper code is provided by key.

FIG. 6 is an alternative code listing for reading the presence of a key.

DETAILED DESCRIPTION OF THE PREFERRED EMBODIMENT

During the manufacture of the software, each tape or other device which carries the program is coded such that the program will not go into full operation unless it receives a coded signal from an input key source. Each program is coded to correspond to a particular binary code from the key itself. This can be accomplished by a system whereby each program is sequentially coded in a predetermined manner, along with its corresponding key. Subsequently, the software disk or tapes, along with their key are sufficiently shuffled so that upon shipment to a particular purchaser, they are basically in random order. In this way, no sequence of codes can be determined by the nature or the arrangement of programs when they are sold.

When the programs are sold, each program has its corresponding key with its particular binary code signal which will emanate from the key when placed in the appropriate port on the computer. This can be used with any number of programs such as general ledger, accounts receivable, certain communication of software, word processing software etc. With this system, each customer can make back-up copies of the program that he needs for his own computer. Any additional copies will be largely useless for the pirate or other user. Because the pirate will not have the key, it will be impossible, as will be seen later in the discussion of the preferred embodiment, to utilize the copy of the program in his or her own computer. Thus, only the legitimate purchaser of the software will be able to utilize the original or any other additional copies of the program.

Figure 1:
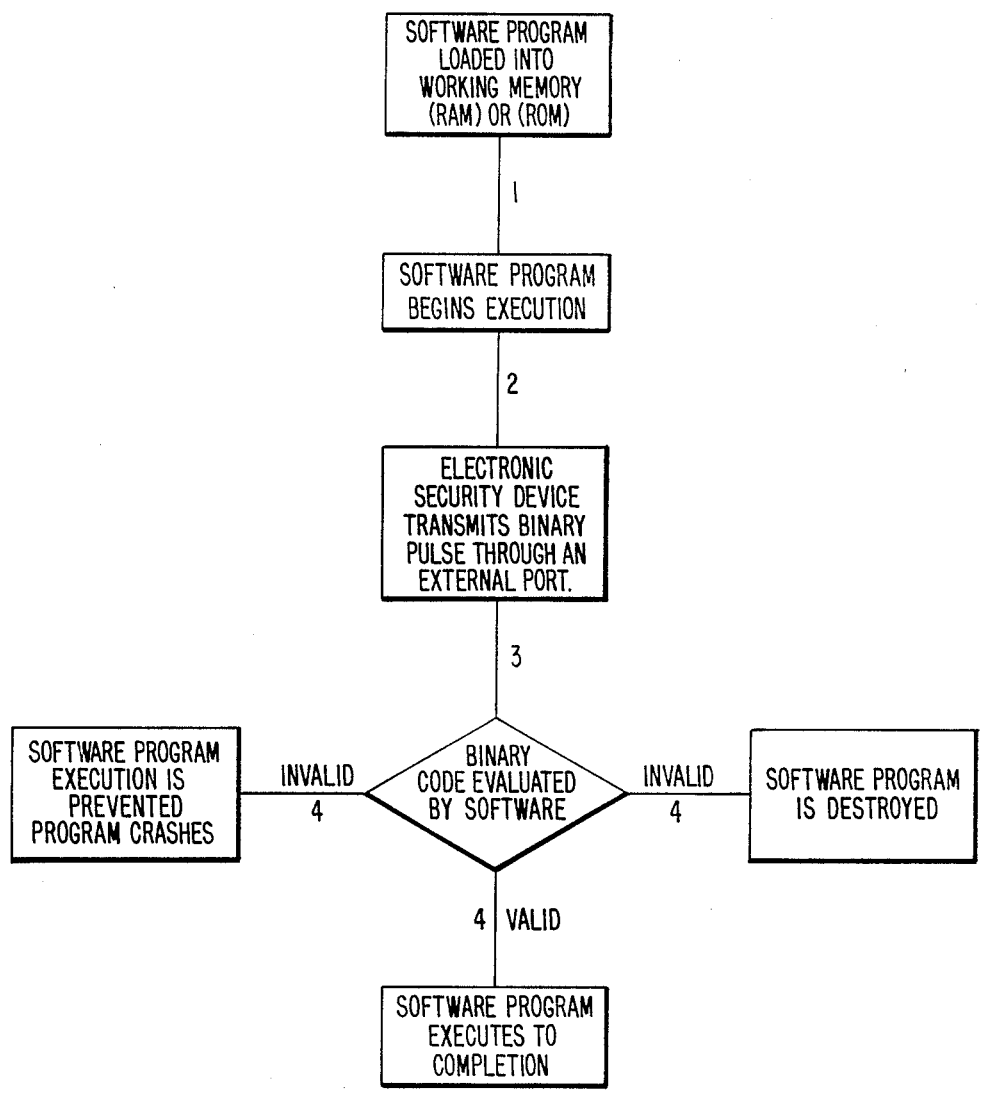
FIG. 1 is a flow chart which schematically depicts the method of the invention.

According to the method of the invention as can be seen in FIG. 1, the key will initially be attached to the appropriate port for permitting the key to transmit the coded signal to the computer. The software disk or tape, if it happens to be a tape, is then placed in the computer with the program being loaded into the working memory (RAM or ROM). The software then begins program execution which includes evaluation of the binary pulse through an external port. The code listing for decoding the numeric pulse combination is shown in FIG. 3. As can be seen in Item No. 4, the binary code is evaluated by the program at the start and/or various parts of the program to determine whether the program can continue execution or should be shut down. If it is an invalid signal, two things can occur. One, the program can include commands which will destroy or otherwise erase the software program. Alternatively, the further program execution is simply prevented and the program crashes. If the signal is a valid signal, one which the program recognizes, the software will continue to execute until completion. The code listing for this purpose is shown in FIG. 6.

Figure 2:
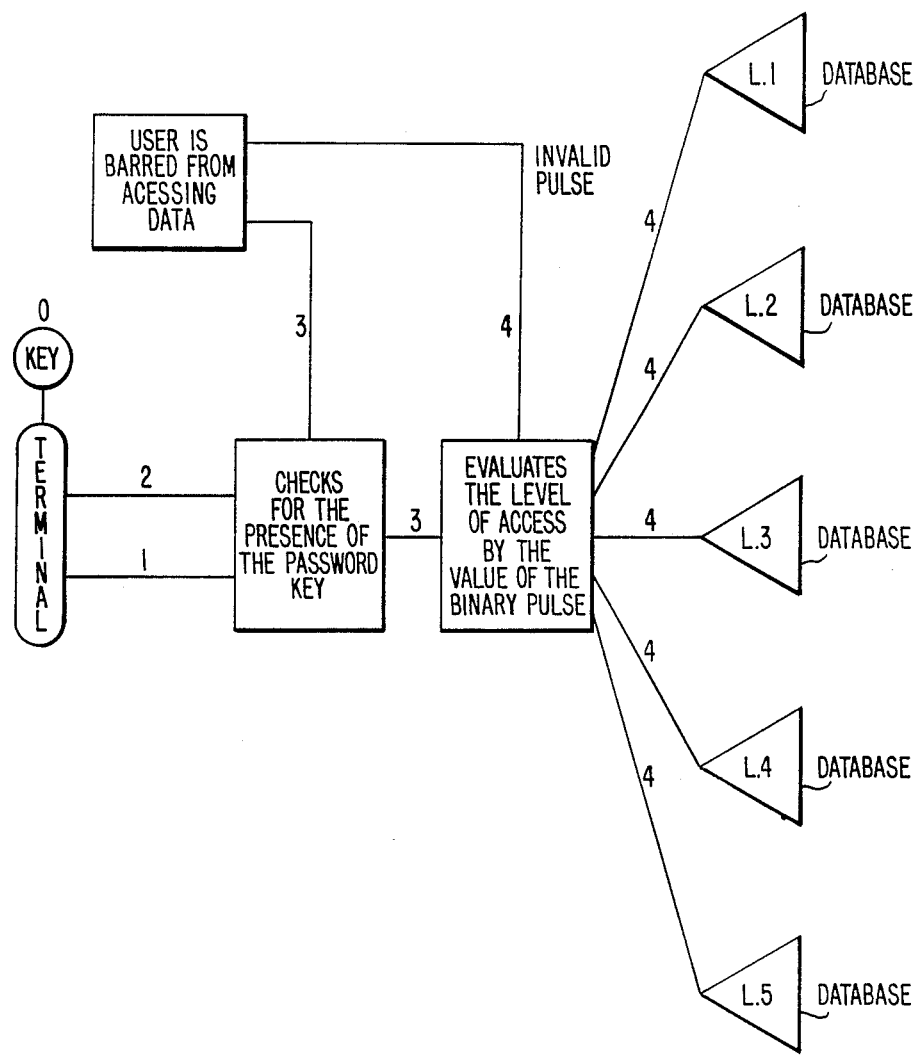
FIG. 2 is a schematic showing the interaction of the system with various data bases.

As can be seen in FIG. 2, the system can actually use a two-step process for executing a particular program. For example, if the key is not in place, the user will be barred from accessing any data from the various data bases. Thus, the program can include an initial check to determine whether the key is there or not. If the key is not in place, further execution of the program will be prevented. The code listing for advising the user that the key must be inserted for further operation is shown in FIG. 4.

The next step is to determine whether the key is in place and if it is the proper key for use with a particular program. As can be seen in FIG. 2, there are five (5) data bases, L1, L2, L3, L4 and L5. These data bases can be on a disk or other source. Before the user will be permitted to use the data base, the host is coded such that further execution for this purpose will not be permitted unless the code from the key is the appropriate one. The code listing for this second step is shown in FIG. 5. As can be seen in FIG. 2, assuming the key is in place, it will transmit a code through an initial evaluation to determine that the key is in place and then through an evaluator, to determine whether the binary pulse is the appropriate one for preventing the data bases to be accessed. If it is not the appropriate one, access to the data bases simply cannot be obtained. In this manner, the key acts as a password.

Figure 1A:
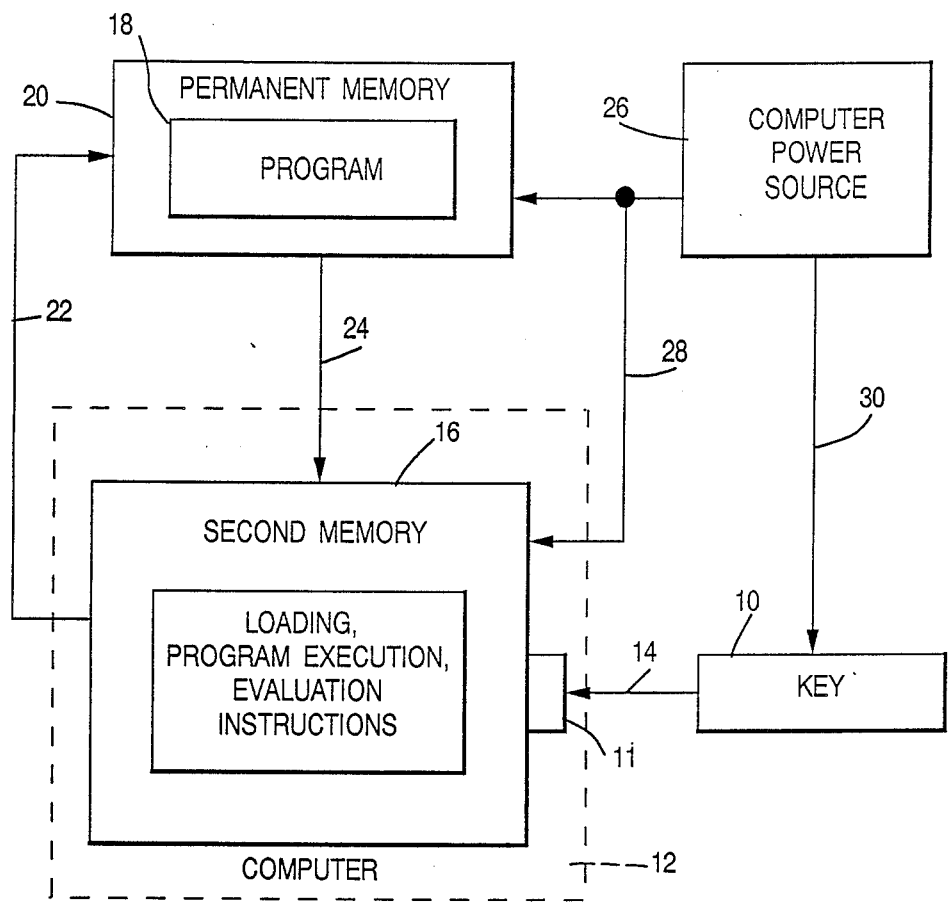
FIG. 1A is a block diagram illustrating the interactions between the various components of computer systems which employ the present invention.

FIG. 1A shows the various components of a computer system which carry out the process of the invention as shown in FIG. 1. FIG. 1A shows a computer system utilizing key 10 which is attached through an external port 11 to computer 12. The key transmits a coded signal 14 to the second memory 16 of the computer. The initial step of the FIG. 1 process is the execution of instructions to load the program 18 from permanent memory 20 (diskette/tape) to the second memory (RAM or ROM) and is carried out through pathway 22. The transfer of the program from permanent memory to second memory is carried out via pathway 24. Once in the second memory, the program begins execution whereupon it receives the signal transmitted by the key and evaluates the coded signal 14 transmitted by key 10.

The evaluation process can be broken down into two steps. The first step determines whether the key has been attached by determining whether the coded signal is presently being transmitted from the key. The second step determines whether the coded signal being transmitted by the key is the appropriate and valid signal. If both steps of the evaluation process are satisfied, the second memory will continue execution of the program. In the event that the key has not been attached to the input port of the computer, the program will advise the user to attach the key to the port. If a key is attached but the coded signal which it is transmitting is invalid, the program will be erased or otherwise destroyed, or alternatively, further execution of the program will be prevented.

FIG. 1A further shows the computer port source 26 which provides power to the computer components via line 28 and also supplies power to the key through line 30.

As explained before, if the code is inaccurate, the system can be programmed to have the entire computer shut down, as well as have the program completely erased.

The above has been a detailed description of the preferred embodiment. The full scope of applicant's invention as defined in the claims which follow and any equivalence thereof. In this regard, the detailed description of the preferred embodiment should not be interpreted as to unduly limit the scope of applicant's invention.

I claim:

1. A computer system comprising:
   a permanent memory;
   a program stored in said permanent memory;
   a computer having a second memory, and instructions for loading said program into said second memory;
   means for securing said program from use by an unauthorized user, comprising an input port of said computer system, a key for releasably attaching to said input port, said key including means for generating a coded signal wherein said generation of said coded signal is independent of said program;
   means for commencing execution of said program;

means for transmitting said coded signal to said second memory;

means for evaluating said coded signal according to security criteria;

means for generating a command signal which causes said computer to complete execution of said program only if said coded signal satisfies the security criteria.

2. The computer system according to claim 1 wherein said coded signal is in binary form.

3. The computer according to claim 1 wherein said computer includes a power source, said key includes means for connecting the power source to said key for generating said signal.

4. A method for securing software used in a computer having a memory, comprising the steps of:
  (1) attaching a key for generating a predetermined coded signal to an input port of said computer said generation of said coded signal being independent of said software;
  (2) loading a program into said memory, said program containing an algorithm for evaluating said signal generated by said key, and instructions for
    (i) accessing the signal being evaluated and
    (ii) allowing execution of said program according to predetermined security criteria;
  (3) commencing execution of said program;
  (4) transmitting said coded signal from said key to said memory;
  (5) evaluating said coded signal according to the security criteria; and
  (6) allowing said computer to complete the execution of said program only if said coded signal from said key satisfies the predetermined security criteria.

5. The method of claim 4, wherein said step of evaluating said coded signal according to the security criteria, comprises:
  (1) determining the presence of the coded signal generated by said key;
  (2) advising the program user that said key should be inserted into said input port, if said coded signal is determined not to be present; and
  (3) evaluating said code for its appropriateness with respect to predetermined security criteria if said key is determined to be present.

6. The method of claim 4, further comprising the step of periodically evaluating the coded signal generated by said key during program execution.

7. The method of claim 4, wherein said steps of attaching and transmitting utilize a male or female port.

8. The method of claim 7, wherein said steps of attaching and transmitting utilize a serial port of said computer.

9. The method of claim 7, wherein said steps of attaching or transmitting utilize a parallel port of said computer.

10. The method of claim 7, wherein said steps of attaching and transmitting utilize at least one of a controller port, expansion port, or lesser port.

11. The method of claim 10, wherein said coded signal comprises a binary signal.

12. The method of claim 7, wherein said port is connected to a power source for providing power to said key to transmit said signal.

13. A method of protecting software where a user accesses a host system, comprising the steps of:
  (1) attaching a key for generating a predetermined coded signal to an input port of a user terminal or computer;
  (2) transmitting said coded signal from the user port to which the key is attached to said host system wherein said host system is coded such that accesses to various software program/databases are determined by said coded signal generated by said key;
  (3) evaluating the coded signal for permission for program execution by said host; and
  (4) once evaluation of step (3) is completed evaluating said coded signal to determine access to said data bases.

* * * * *